Oct. 19, 1971  R. C. POSH ET AL  3,613,359
ASPIRATED EXHAUST SYSTEM
Filed Jan. 15, 1970  2 Sheets-Sheet 1

INVENTORS
Raymond C. Posh, &
BY William J. Downs

Barnard, McGlynn & Raising
ATTORNEYS

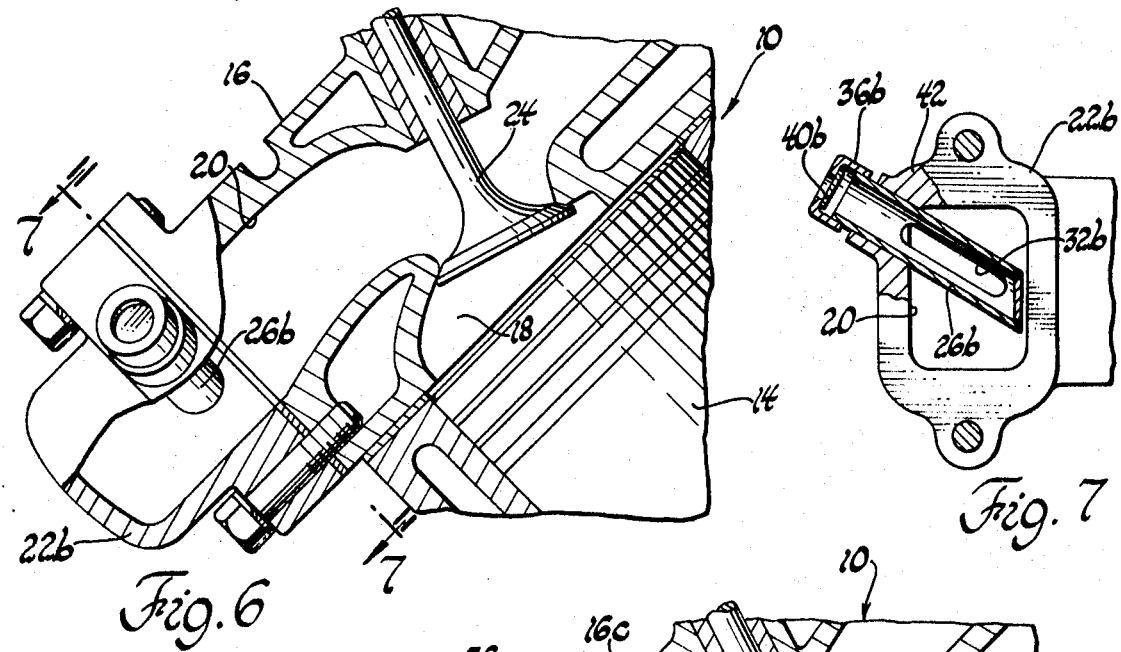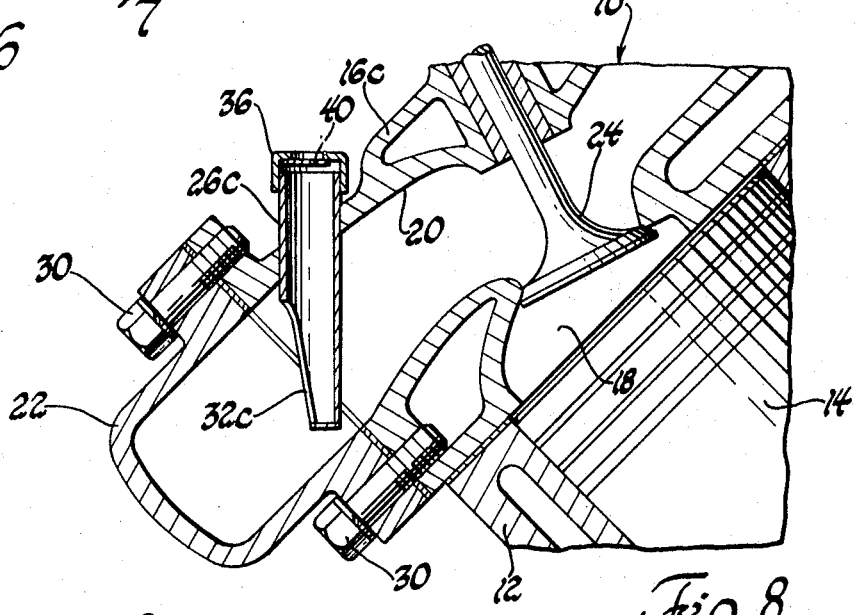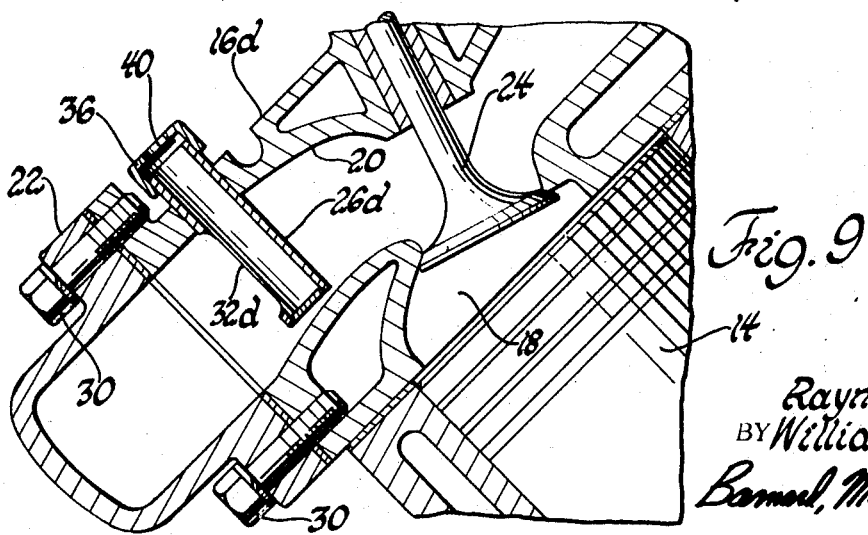

United States Patent Office 3,613,359
Patented Oct. 19, 1971

3,613,359
ASPIRATED EXHAUST SYSTEM
Raymond C. Posh, Livonia, and William T. Downs,
Howell, Mich., assignors to Lear Siegler, Inc., Santa
Monica, Calif.
Filed Jan. 15, 1970, Ser. No. 3,157
Int. Cl. F01n 3/10
U.S. Cl. 60—30                                      9 Claims

ABSTRACT OF THE DISCLOSURE

An air aspirating device in the form of a tubular member which is disposed in the exhaust gas passage adjacent the exhaust valve and equipped with a check valve to aspirate ambient air into the exhaust stream thereby to promote continuing exhaust gas combustion after removal from the combustion chamber. The air aspirating device may be installed in the head assembly of the engine or in the exhaust manifold or in an adaptor member which is to be disposed between the head assembly and the exhaust manifold.

---

Figure 1:
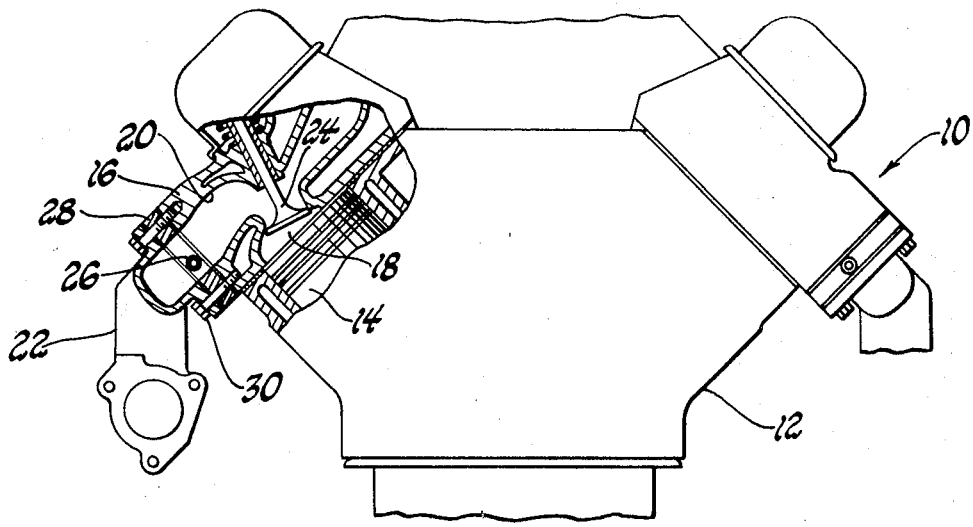

This invention relates to exhaust emission reduction systems and particularly to such systems as function on the principle of continued exhaust gas oxidation following passage of such gas through the engine exhaust port.

It is well known that the air contaminating constituents of internal combustion engine exhaust gases result largely from incomplete oxidation in the engine combustion chamber. Accordingly, a reduction in these constituents can be accomplished by effecting in some manner a more thorough oxidation process. There are several techniques for accomplishing improved oxidation, these techniques being ordinarily usable alone as well as in combination. The category to which the subject invention relates is that of promoting continuing oxidation of exhaust gases following removal of such gases from the engine combustion chamber. The apparatus most often employed in this category is the exhaust manifold reactor; normally a heavy, insulated structure mounted on or near the engine to receive the exhaust gases and a supply of auxiliary air and designed to provide a large volume in which the exhaust gases continue to be oxidized after removal from the engine combustion chamber.

There are several disadvantageous aspects of the exhaust manifold reactor. It is a fairly large device, a typical size being about four and one-half inches by twenty-two inches. Moreover, in a V-type engine two such reactors are normally required and, thus, the already cramped underhood space must accommodate two fairly large additional objects. Further, installation is generally fairly difficult since a good deal of exhaust gas plumbing is required as well as a pump for positively pumping auxiliary air into the reactor or exhaust passages. This pump, of course, is an additional engine-taxing accessory which may reduce engine performance by one or more miles per gallon. Finally, the reactors are subject to longevity problems due to the high temperatures and corrosive conditions in which they operate and, thus, they may give rise to service requirements for periodic checking and possibly replacement.

The present invention, like the exhaust manifold reactor, promotes exhaust gas oxidation after removal of the gas from the combustion chamber proper. However, the present invention requires no large insulated reactor apparatus, it is easily installed on the engine. An important feature of the invention is that it requires no positive air pumping. Moreover, it is simple in design and operation and should service ever become necessary it may be carried out on a replacement basis with a minimum of difficulty.

The invention is, of course, intended for operative association with an internal combustion engine having at least one combustion chamber, an exhaust passage extending from that chamber and an exhaust valve for regulating the flow of exhaust gases between the chamber and the passage. The objects set forth above are carried out by means of an air aspirating conduit which extends from an ambient air supply into the exhaust passage and which has an aperture within the passage for introducing ambient air into the exhaust stream and which further has a check valve for regulating the introduction of ambient air into the stream and to prevent the reverse flow of exhaust gases through the aspirating conduit.

In accordance with the invention, the aspirating device being physically within the exhaust passage produces a localized throttling effect which results in a localized low-pressure condition in the exhaust stream. This low-pressure condition in turn draws ambient air through the check valve and through the aspirating conduit into the exhaust stream. The aspirating device is preferably located at a point proximate the valve controlled exhaust port where the exhaust temperature will support continuing oxidation without the need for an igniter device.

In a specific form, the aspirating device of the subject invention is a simple, tubular conduit having one or more elongated openings which open at least generally in the direction of exhaust gas flow when installed in the exhaust gas passage. The tubular conduit is installed in or integrated with the engine block or the exhaust manifold or, alternatively, the tubular conduit may be installed in or integrated with an adapter member which is designed for placement between the engine head assembly and the exhaust manifold. With such variation and installation capability the aspirating device is easily installed either as original or replacement equipment and may be operatively associated with a conventional internal combustion engine without the need for significant engine modification or alteration.

The various features and advantages of the invention will become more apparent upon reading the following specification which describes several illustrative embodiments of the invention. This specification is to be taken with the accompanying drawings of which, FIG. 1 is an end view partly in cross-section of a V-type internal combustion engine employing one form of the invention, FIG. 2 is an enlarged view of the exhaust passage area and apparatus of the engine of FIG. 1, FIG. 3 is a view of the apparatus of FIG. 2 taken along a section line 3—3 thereof, FIG. 4 is a perspective view of the embodiment of the invention shown in FIGS. 1 through 3, FIG. 5 is a cross-sectional view of an alternative embodiment of the invention, FIG. 6 is a sectional view of an engine employing another alternative embodiment of the invention wherein the aspirating device is installed in the exhaust manifold, FIG. 7 is a sectional view of the apparatus of FIG. 6 along a section line 7—7 thereof, FIG. 8 is a sectional view of another alternative embodiment to the invention wherein the aspirating device is installed in the head assembly, and FIG. 9 is a sectional view of yet another alternative embodiment of the invention wherein the aspirating device is also installed in the head assembly.

Referring to FIG. 1 a V-type engine 10 is shown to include a block 12 supporting a plurality of pistons 14 for reciprocal displacement within respective cylinders. Disposed on the block 12 is a head assembly 16 which defines a combustion chamber 18 immediately above the piston 14 and an exhaust passage 20 for the conveyance of exhaust gases from the combustion chamber 18 to the atmosphere through an exhaust elimination manifold 22. The flow of exhaust gases from the chamber 18 to the passage 20 is regulated by means of an exhaust valve 24 which is suitably disposed within a port defined by the head assembly 16. The arrangement of apparatus thus far described is entirely conventional.

Figure 2:
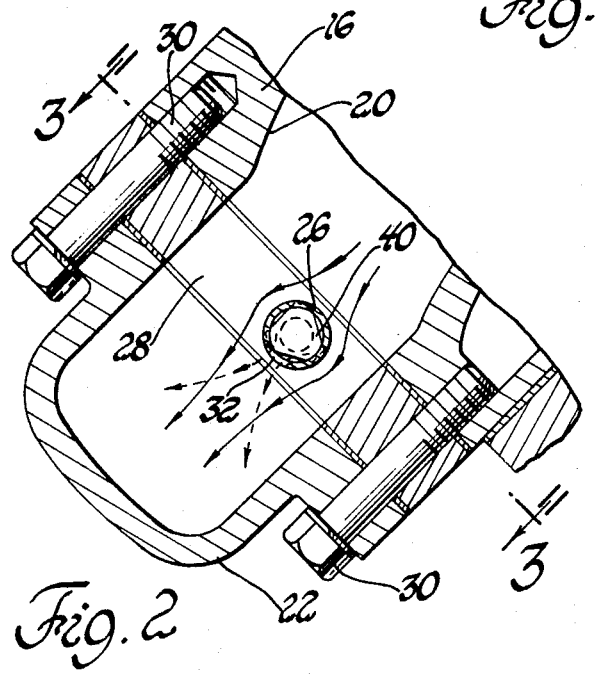
Figure 3:
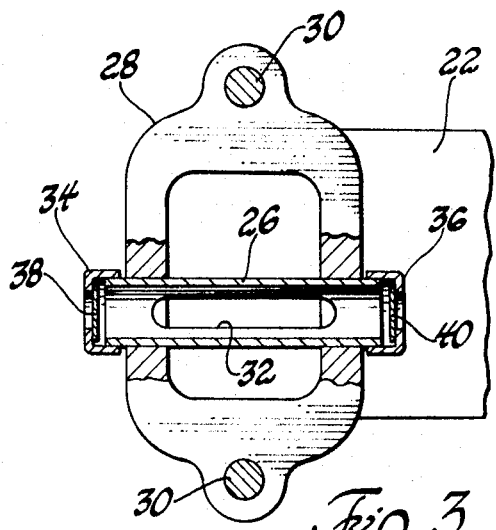
Figure 4:
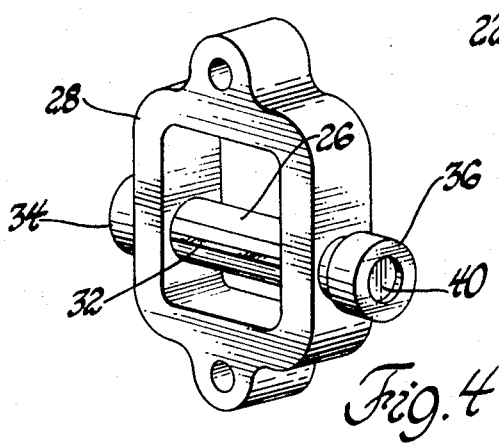

As shown in FIGS. 1 through 3, an air aspirating conduit 26 in the form of a tubular member of heat resistant material is disposed in the exhaust passage 20 and is carried by a generally annular adaptor member 28. The adaptor member 28, as best shown in FIGS. 3 and 4, is a hollow ring of heavy material such as sintered iron having a generally rectangular interior hollow which forms a continuation of the exhaust passage 20 when placed between the head assembly 16 and the exhaust manifold 22 as shown in FIG. 1. The combination of the exhaust manifold 22 and the adaptor member 28 as well as sealing gaskets is held together by means of bolts 30 which extend through suitably located openings in the manifold and adaptor member into tapped holes in the head assembly 16.

The tubular aspirating conduit 26 extends between and through opposite legs of the adapter member 28 so as to be oriented crosswise in the exhaust passage 20. An elongated aperture 32 is formed in the tubular air aspirating conduit 26 and is oriented so as to open in the direction of exhaust gas flow as best illustrated in FIG. 2. The opposite ends of the conduit 26 extend through the legs of the adapter member 28 so as to be in communication with ambient or outside air. The ends of the conduit 26 receive caps 34 and 36 having axially aligned openings therein to permit the flow of ambient air into both ends of the tubular conduit 26 and through the aperture 32 to the exhaust passage 20. Reverse flow from the exhaust passage 20 through the conduit 26 is prevented by means of reed-type check valves 38 and 40 which are disposed between the caps 34 and 36, respectively, and the opposite ends of the conduit 26. The check valves 38 and 40 are dimensioned so as to fully close the openings in the caps 34 and 36, respectively whenever the pressure conditions within the exhaust gas passage 20 exceeds the ambient pressure. However, the reed valves 38 and 40 are axially displaceable away from contact with the caps 34 and 36 and into engagement with the ends of the conduit 26 to permit the flow of ambient air through the openings in the caps 34 and 36 whenever the pressure conditions within the exhaust passage 20 are lower than ambient.

As best shown in FIG. 2 the valves 38 and 40 are of generally triangular configuration such that movement thereof into contact with the ends of the conduit 26 does not close the ambient air flow path. A slight clearance is therefore required and provided between the ends of the conduit 26 and the caps 34 and 36. The reeds 38 and 40 travel in this clearance. Other types of check valves may, of course, be used.

To assemble the air aspirating conduit 26 with the internal combustion engine 10 shown in FIG. 1, the exhaust manifold 22 is removed and the adaptor member 28 is disposed between the head assembly 16 and the exhaust manifold 22. The tubular conduit 26, thus, extends across the exhaust passage 20 with the aperture 32 opening in the direction of exhaust gas flow. The conduit 26 is, thus, proximate the exhaust port which is regulated by valve 24 such that the temperature of the exhaust gases in the area of the conduit 26 is high enough to support continuing oxidation or combustion. Temperatures of approximately 1700° F. are typical.

When the exhaust valve 24 opens the exhaust port, the exhaust gases from the combustion chamber 18 rush through the exhaust passage 20 in the head assembly 16 and the manifold 22. This flow of exhaust gases experiences a mild throttling effect due to the presence of the conduit 26 in the flow passage. Accordingly, an increased flow velocity and, thus, a reduced pressure condition exists around and immediately downstream of the conduit 26. This reduced pressure condition tends to move the check valves 38 and 40 off of their seats on the caps 34 and 36 and to draw ambient air through the openings in the caps 34 and 36, through the conduit 26 and out the aperture 32 where the ambient air is mixed with the high-temperature exhaust gases. The introduction of comparatively oxygen-rich ambient air with the high temperature exhaust gases immediately downstream of the aspirating device 26 supports the continuing oxidation or combustion of the exhaust gases and, thus, reduces the final unburned hydrocarbon and carbon monoxide constituents thereof. The operation of the check valves 38 and 40 prevents the flow of exhaust gases through the air aspirating conduit 26 whenever the pressure conditions within the chamber 20 exceed atmospheric. Accordingly, continuing combustion or oxidation of the exhaust gases is accomplished without the use of a positive displacement pump or any other engine taxing facility to positively pump air into the exhaust passage. Moreover, the high temperature and, in fact, flaming condition of the exhaust gases in the vicinity of the exhaust valve 24 and the air aspirating conduit 26 eliminates the need for any igniter device to reignite the mixture of the exhaust gases and air. However, it is recognized that the apparatus of the invention may also be placed farther downstream in the exhaust flow system and used with an igniter device if desired.

As shown in FIG. 4, the adapter device 28 is a solid piece of suitable material such as sintered metal which may be easily and inexpensively fabricated in large quantities. The adapter member 28 is provided with holes 41 to permit assembly with the head assembly bolts 30 and laterally opposite holes which receive the ceramic coated or stainless steel tubular conduit 26. Alternatively, the air aspirating conduit 26 and adapter member 28 may be cast or molded as a single integral piece. It will be observed that the location of the aspirating conduit 26 within the rectangular opening of the adapter member 28 is somewhat off center. The purpose of this off-center location is to place the conduit 26 and particularly the aperature 32 in the concentrated center of the exhaust gas flow. This may be on or off center according to the geometry of the engine with which the device is combined and, thus, the particular location of the air aspirating conduit relative to the side legs of the member 28 may vary from engine to engine.

Figure 5:
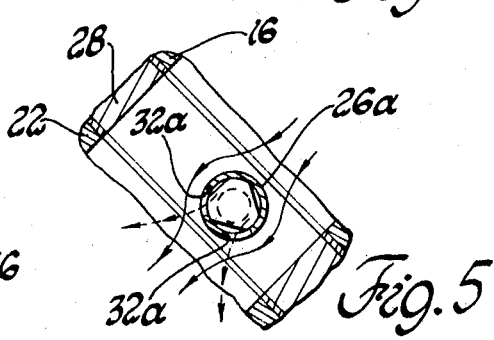

FIG. 5 shows an alternative form of the adapter type embodiment of the invention wherein the air aspirating conduit 26a is a tubular member having a pair of elongated apertures 32a which are spaced apart and on opposite sides of a centerline extending in the direction of exhaust gas flow. This alternative embodiment permits the introduction of ambient air into the exhaust stream from two slightly spaced apertures and may under certain conditions represent the most efficient air introduction scheme. Otherwise the embodiment of FIG. 5 is identical with that of FIGS. 1 through 4 as indicated by the use of corresponding reference characters for the head assembly 16, the exhaust manifold 22, and the adapter member 28.

As previously indicated, the air aspirating device 26 may be suitably combined with the internal combustion engine as original equipment rather than by means of an adapter member such as that designated as 28. Such an arrangement is shown in FIG. 6 wherein an air aspirating conduit 26b is disposed in the exhaust manifold 22a so as to extend directly into the exhaust gas passage 20 which is defined thereby. As shown in FIGS. 6 and 7, the internal combustion engine 10 again includes a head assembly 16 having an exhaust valve 24 separating a combustion chamber 18 from the exhaust gas passage 20 which extends through a portion of the head assembly and the exhaust gas manifold 22b. The manifold 22b is provided with an area 42 of enlarged wall thickness which is subsequently bored out to receive a tubular air aspirating conduit 26b. The area 42 is angularly disposed relative to the generally rectangular interior of the manifold 22b such that the air aspirating conduit 26b extends across the exhaust passage 20 at an angle as best shown in FIG. 7. The portion of the aspirating device 26 within the exhaust gas passage 20 is provided with an axially oriented and elongated aperture 32b which opens in the direction of exhaust gas flow. The aspirating device 26b extends through the bored out area 42 and receives a cap 36b which confines and regulates the operation of a reed-type check valve 40b in the manner previously described with reference to FIG. 3. Accordingly, ambient air is permitted to flow past the check valve 40 and through the aspirating device 26 and from the aperture 32b into the exhaust stream through the passage 20. However, the check valve 40b in combination with the cap 36b prevents the reverse flow of exhaust gases from the passage 20 through the aspirating device 26 to the atmosphere. The operation of the embodiment of FIGS. 6 and 7 is otherwise identical to that of the embodiment of FIGS 1 through 4 as previously described.

The air aspirating conduit of the subject invention may also be suitably combined with the head assembly of an internal combustion engine rather than with the adaptor member 28 of FIGS 1 through 4 or with the exhaust gas manifold of 22b of FIGS. 6 and 7. Such an arrangement is shown in FIG. 8 wherein an air aspirating conduit 26c again of tubular configuration is shown in combination with the head assembly 16c of an internal combustion engine 10. The engine 10 again includes a block 12 which supports piston 14 and the head assembly 16c which defines a combustion chamber 18 and an exhaust passage 20. Chamber 18 and passage 20 are again separated by an exhaust valve 24. The exhaust passage 20 of the head assembly 16c is in direct communication with and is actually continued by a conventional exhaust manifold 22 which is secured to the head assembly by means of bolts 30.

Referring again to FIG. 8 the head assembly 16c is bored out downstream of a valve 24 to permit the installation therein of the tubular air aspirating conduit 26c such that the conduit extends directly into and across the exhaust gas passage 20. In the embodiment of FIG. 8 the device 26c is angularly disposed relative to the head assembly 16c and protrudes into the exhaust gas passage 20 on a substantial angle such that the bottom or innermost end of the conduit 26c is actually partly into the manifold volume. Because of the angular orientation of the device 26c relative to the exhaust gas passage 20, the aperture 32c in the conduit 26c is formed by taking an angular slice through the wall of the tubular device 26c. The aperture 32c which is formed by this slice is again oriented such that it opens in the direction of exhaust gas flow thereby to cause the air aspirating device 26c to operate as previously described with reference to the other embodiments. The air aspirating conduit carries a cap 36 having an axially opening and cooperating with a reed-type check valve 40 in a manner similar to the construction and operation of the check valves of FIGS. 3 and 7. Obviously, the aspirating conduit 26c may be formed separately from the head assembly 16c and inserted therein in either a permanent or removable fashion. Alternatively it may be feasible to form the head assembly 16c with the tubular portions of the air aspirating conduit 26c as an integral portion thereof.

An alternative embodiment of the installed-in-head air aspirating conduit is shown in FIG. 9. The apparatus illustrated in FIG. 9 shows an internal combustion engine having a block 12 supporting reciprocating pistons 14 and head assembly 16d. The head assembly 16d defines a combustion chamber 18 and an exhaust passage 20 which is separated by means of an exhaust valve 24. An exhaust manifold 22 bolts onto the head assembly 16d to form a continuation of the exhaust gas passage 20. The head assembly 16d is bored out substantially perpendicular to the flow direction in the exhaust gas passage to receive the air aspirating conduit 26d. In the embodiment of FIG. 9, the conduit 26d takes the form of a tubular member of heat resistant material having an elongated aperture 32d formed therein to permit the flow of ambient air from outside the engine into the exhaust gas passage 20. The air aspirating device 26d extends to the atmosphere through the wall of the head assembly 16d and receives a cap 36 which operates with a reed 40 to form a check valve in the manner previously described with reference to the other embodiments. Again, the air aspirating device 26d may be installed separately in the head assembly 16d or formed integrally therewith and is located within the exhaust gas passage 20 to produce the aforementioned throttling effect. As such, the air aspirating device 26d is preferably located in the concentrated area of the exhaust gas flow.

It is to be understood that the subject invention has been described with reference to various illustrative embodiments and that none of these embodiments are to be considered as limiting the invention to the illustrating details. For a definition of the invention, reference should be had to the appended claims.

The embodiments of the invention in which an exclusive property or privilege is claimed are defined as follows:

1. Anti-emission apparatus for internal combustion engines of the type having a combustion chamber an exhaust passage and an exhaust valve between the chamber and passage, the apparatus comprising: air aspirating means disposed in the exhaust passage proximate the valve and communicating with ambient air, an aperture in the aspirating means opening substantially in the direction of exhaust gas flow, and check valve means on the aspirating means to admit ambient air to the passage when the exhaust valve is open and to prevent a reverse flow of gases therethrough when the exhaust valve is closed the air aspirating means comprising a tubular conduit of heat resistant material which is disposed within the exhaust passage so as to create a throttling effect on the exhaust gases flowing therearound, the opposite ends of the conduit extending through respective portions of the passage wall, and check valve means on each end of the conduit.

2. Apparatus as defined in claim 1 wherein the air aspirating means is disposed within the exhaust gas flame volume adjacent the exhaust valve.

3. Apparatus as defined in claim 1 wherein the tubular conduit is of cylindrical configuration.

4. Apparatus as defined in claim 1 wherein the aperture is formed by an axial slit in the tubular conduit.

5. Apparatus as defined in claim 1 wherein the aperture is formed by an angular truncation of the tubular conduit.

6. Apparatus as defined in claim 1 including an adaptor member of such configuration as to be disposed between an exhaust manifold and an engine, the tubular conduit being disposed in the adaptor member.

7. Apparatus as defined in claim 6 wherein the adaptor member is of a shape generally conforming to the exhaust gas passage and includes means for assembly to the engine.

8. An exhaust aspirator comprising a generally annular adaptor member having a center opening and configured to be inserted between an engine and an exhaust manifold such that the opening therethrough becomes a continuation of the exhaust passage from the engine, a tubular conduit connected through and extending across the adaptor member, an aperture in the tubular conduit within the opening, the tubular conduit having longitudinally opposite ends thereof extending through at least substantially opposite wall portions of the adaptor member and having first and second check valve means disposed on the opposite ends externally of the adaptor member for the purpose of admitting air into the conduit but preventing the reverse flow of exhaust gases from the interior of the adaptor member.

9. The apparatus defined in claim 8 wherein the tubular conduit is disposed in the adaptor member so as to be in the area of maximum exhaust gas flow when installed on the engine.

References Cited

UNITED STATES PATENTS

| | | | |
|---|---|---|---|
| 2,005,249 | 6/1935 | Tietig | 60—30 |
| 2,851,852 | 9/1958 | Cornelius | 60—30 |
| 2,854,816 | 10/1958 | Bodine | 60—30 |
| 3,285,002 | 11/1966 | Hines | 60—30 |
| 3,300,964 | 1/1967 | Knopp | 60—30 |
| 3,390,520 | 7/1968 | Mattson | 60—30 |
| 3,438,198 | 4/1969 | Bentele | 60—30 |
| 3,520,131 | 7/1970 | Briggs | 60—30 |

DOUGLAS HART, Primary Examiner